Feb. 23, 1954

F. A. BUECHLER 2,669,908

CONTOUR MILLING MACHINE

Filed Dec. 21, 1951

INVENTOR.
BY FRANK A. BUECHLER
*Ely & Frye*
ATTORNEYS

Feb. 23, 1954

F. A. BUECHLER 2,669,908

CONTOUR MILLING MACHINE

Filed Dec. 21, 1951

INVENTOR.
FRANK A. BUECHLER
BY Ely & Frye
ATTORNEYS

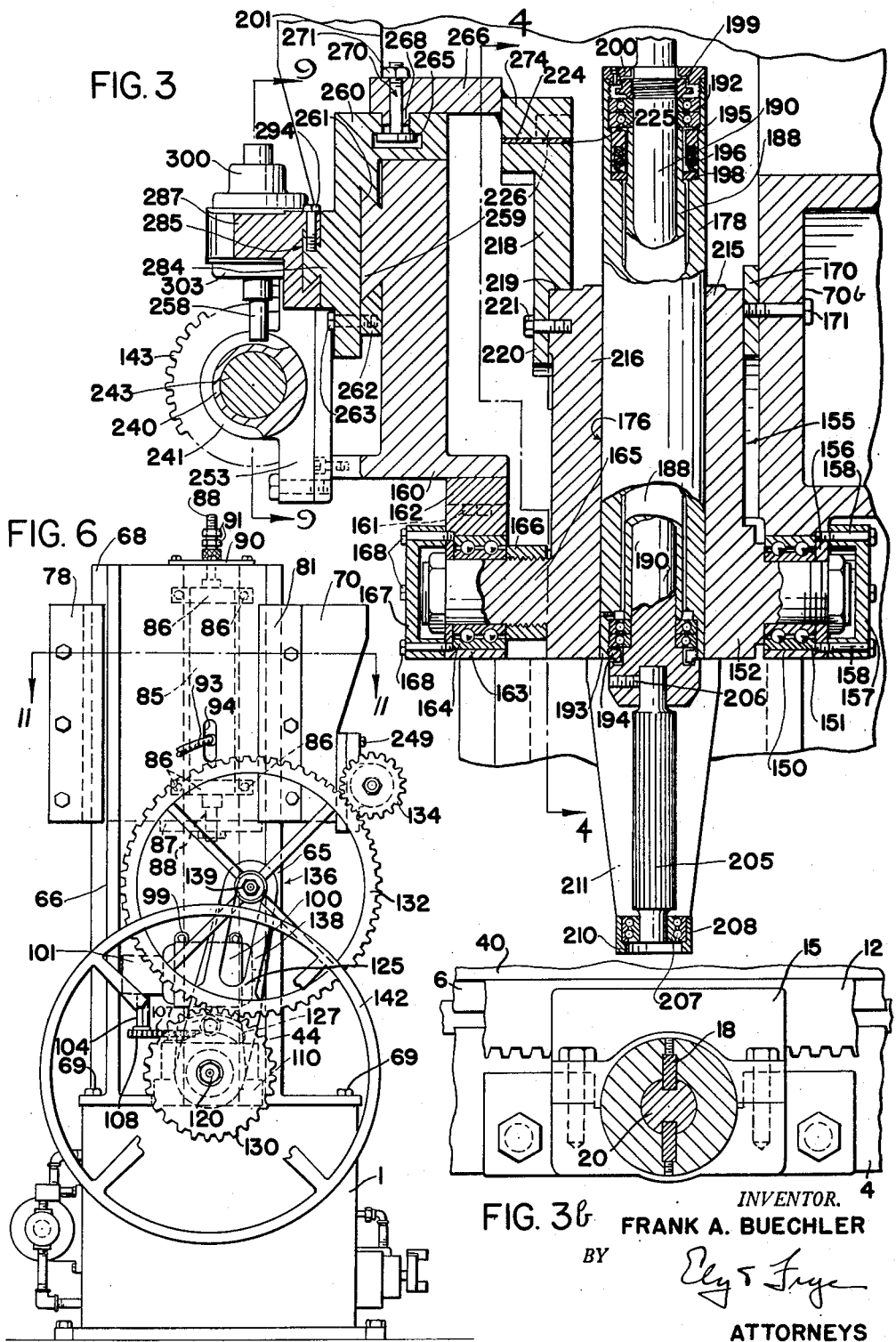

Feb. 23, 1954　　　　　F. A. BUECHLER　　　　　2,669,908
CONTOUR MILLING MACHINE

Filed Dec. 21, 1951　　　　　　　　　　　　　　　　7 Sheets-Sheet 4

INVENTOR.
FRANK A. BUECHLER
BY

ATTORNEYS

Feb. 23, 1954     F. A. BUECHLER     2,669,908
CONTOUR MILLING MACHINE
Filed Dec. 21, 1951     7 Sheets-Sheet 5
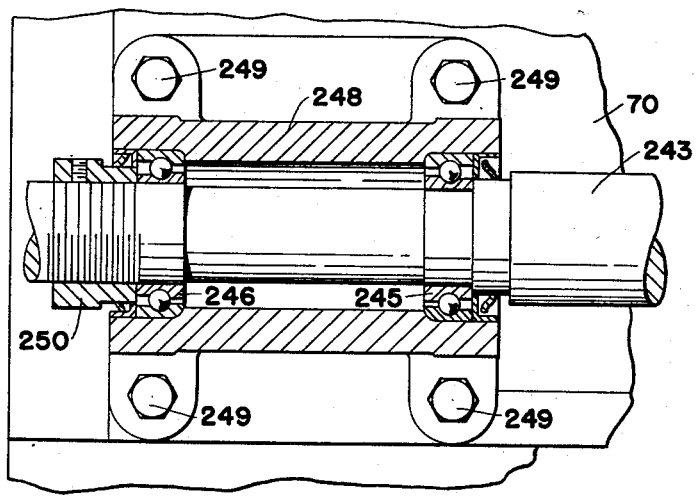
FIG. 8
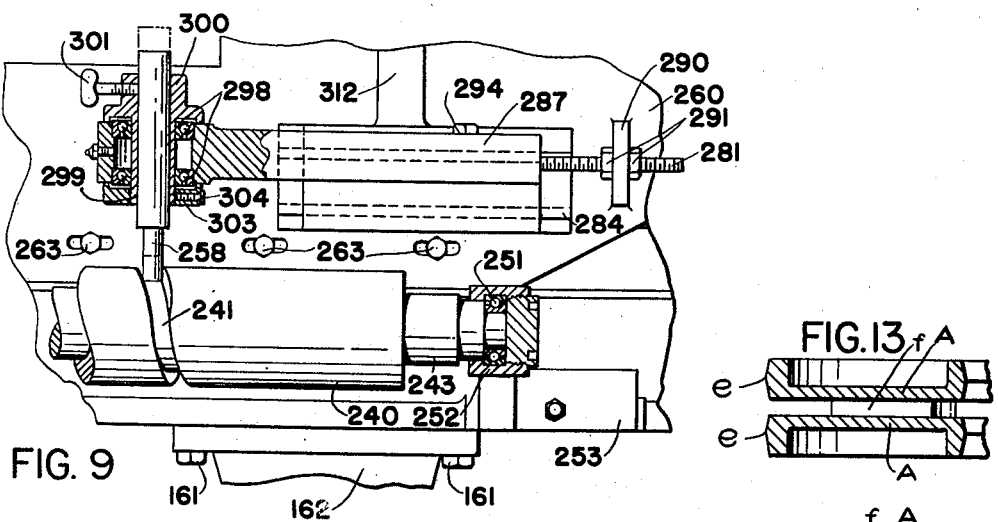
FIG. 9
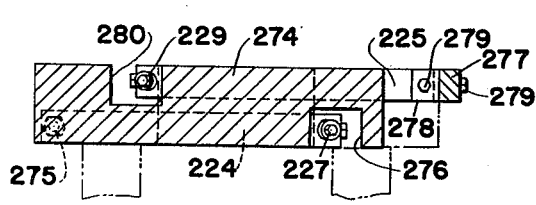
FIG. 12
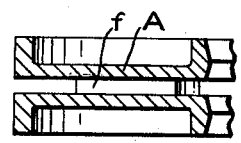
FIG. 13
FIG. 14
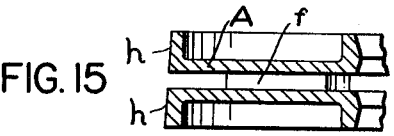
FIG. 15
INVENTOR.
FRANK A. BUECHLER
BY Ely & Frye
ATTORNEYS Feb. 23, 1954 F. A. BUECHLER 2,669,908
CONTOUR MILLING MACHINE
Filed Dec. 21, 1951 7 Sheets-Sheet 6

INVENTOR.
FRANK A. BUECHLER
BY
ATTORNEYS

INVENTOR.
FRANK A. BUECHLER
BY
ATTORNEYS

Patented Feb. 23, 1954

2,669,908

UNITED STATES PATENT OFFICE 2,669,908

CONTOUR MILLING MACHINE

Frank A. Buechler, Tallmadge, Ohio, assignor, by mesne assignments, to Bridgewater Machine Tool Co., Akron, Ohio, a corporation of Ohio Application December 21, 1951, Serial No. 262,751

3 Claims. (Cl. 90—13.7)

1

The present invention relates to the construction of machines for cutting irregular contours and, while the principles of the invention may be applied to finishing a large variety of work pieces, the machine has been designed particularly for the purpose of machining the elliptical peripheries of frames which are used in the construction of jet planes for the armed forces.

The frames of the jet planes referred to are elliptical in the area in which the work is performed by the machine of this invention, but the outside faces of the work piece gradually decrease in angularity with respect to the plane of the piece from a point near the midway point or top of the elliptical area to the extremes thereof.

The machining of a surface such as described must be very accurate as it is against these surfaces that the outer wall or skin of the fuselage is riveted, and the machine shown and described herein is especially adapted for this type of milling operation. The tolerances allowed are very close and accuracy in cutting is one of the prime requisites of the machine. The machine is largely automatic and the work is done quicker and more accurately than it is possible to do it with known machines and methods.

In the operation of the machine, it is usual to finish two work pieces at the same time, the work pieces when assembled constituting a single frame, and the machining operation is thus done on both pieces so that the work is perfectly turned out and the two pieces correspond.

As the frames are forged, they have outwardly beveled surfaces due to the die draft and the machine is adapted, first, to remove these draft surfaces and then to finish both pieces without resetting the work.

The machine is relatively simple, considering the peculiar and accurate work which it performs, and has many advantages over prior machine tools which have been used for this type of work with indifferent success. The cost of making these frame parts is greatly reduced and, in addition, the work is done accurately and quickly.

It will be understood that the invention is shown and described herein in its best known and preferred form, but the invention is not limited or restricted to a following of the details which are given. On the contrary, the machine

2 may be modified or improved within the scope of the invention as set forth in the appended claims.

In the drawings, in which the practical and operative embodiment of the invention is shown as it has been perfected and used:

Fig. 3 is a vertical cross section through the head on the line 3—3 of Fig. 2.

Fig. 3b is a section on the line 3b—3b of Fig. 1.

Fig. 6 is a rear elevation of the machine on the line 6—6 of Fig. 1 showing the transmission from the table to the rotating cam or pattern which controls the inclination of the cutting tool by which the angle on the work is generated.

Fig. 7 is a detailed view showing the follower or tracer which controls the movement of the work support to generate the elliptical form of the work. The location of this view is indicated by the line 7—7 of Fig. 1.

Fig. 8 is a section through the rear or inboard bearing for the cam shaft, the location of this view being shown by the line 8—8 of Fig. 2.

Fig. 9 is a vertical section through the pattern and pattern follower or stylus on the line 9—9 of Fig. 3.

Fig. 12 is a detail of the tool rocking mechanism on the line 12—12 of Fig. 4.

Figs. 13, 14 and 15 are sectional views taken through the work pieces showing the successive steps performed thereon.

The work piece

Figure 1:
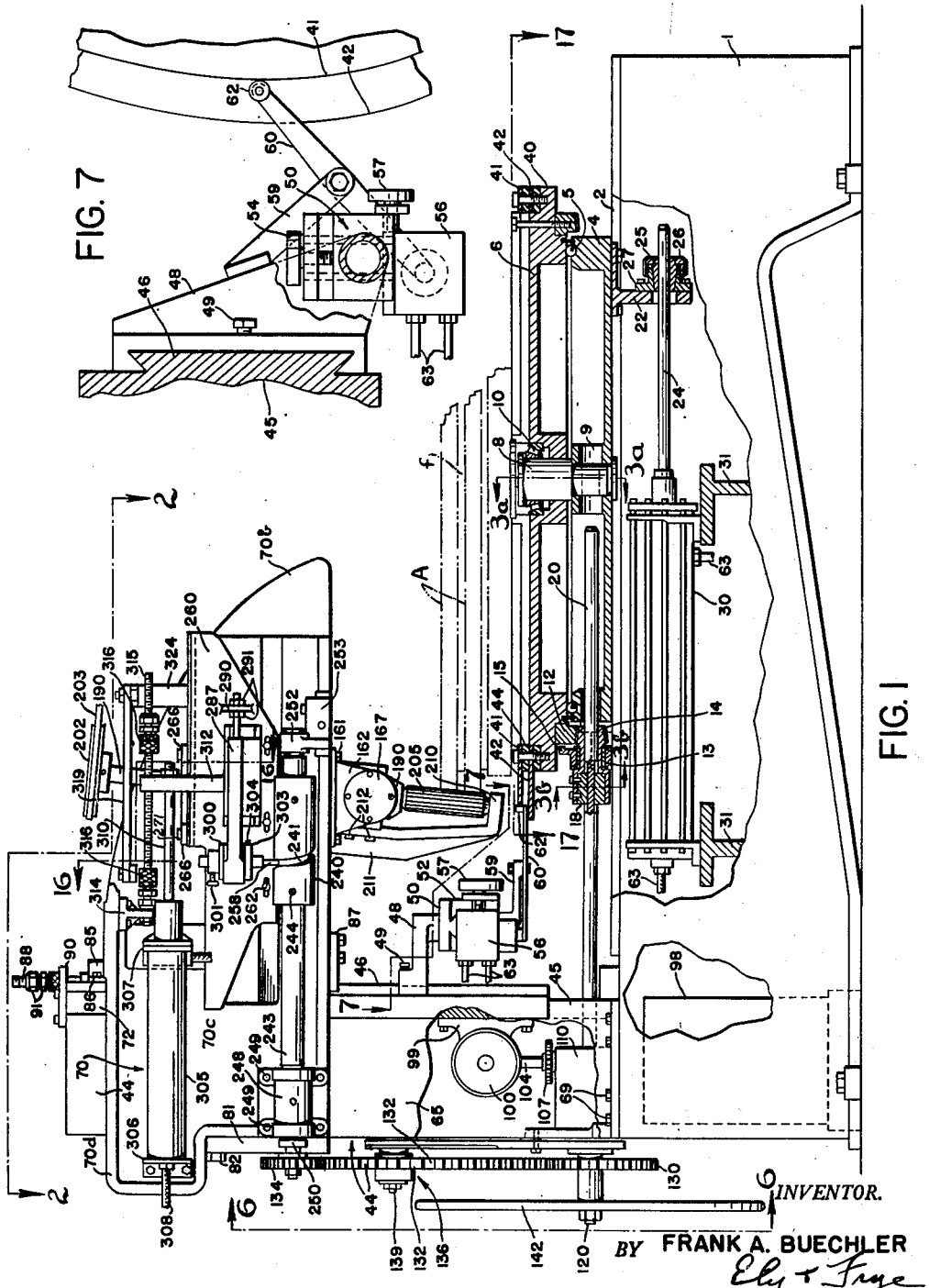
Fig. 1 is a side elevation of the complete machine, the work table being shown in section.

The work piece is indicated at A, the top of the work piece being indicated at $a$ and the lower limits of the angular areas are indicated at $b$ and $c$. When the raw work piece is received from the maker, the perimeter thereof between the points $b$ and $c$ and through the point $a$ is formed on an ellipse closely approximating the elliptical contour of the finished piece, although it is impossible to cast or forge the work piece to the accurate shape which is required in the finished article. When the work piece is received, its outer perimeter is formed with a double bevel or crown $e$ due to the necessary die draft.

As shown in the drawings, the preferred procedure is to mount two of the frames or work pieces on the work table, with spacers $f$ between them, and to machine the two superposed pieces at one time, both in the interests of economy and to obtain pairs of pieces which are similar in contour.

Figure 18:
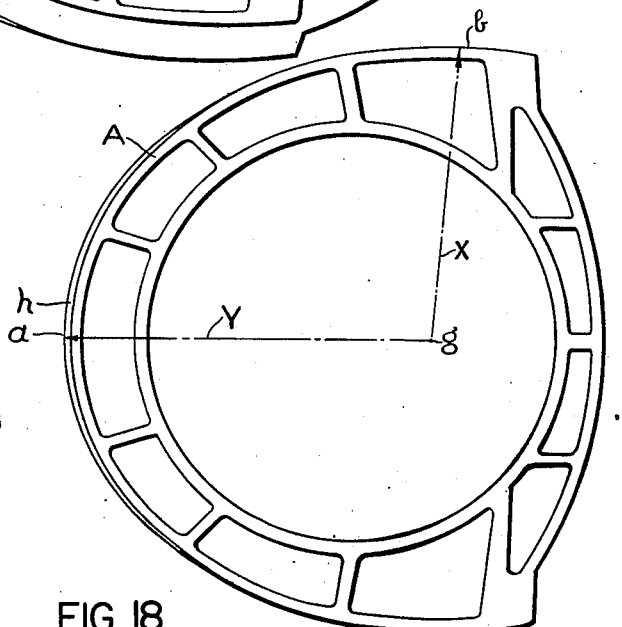
Fig. 18 is a plan view of the finished piece.

When each work piece is finished in the form shown in Fig. 18, the distances $x$ from the central point $g$ to the points $b$ and $c$ are less than the distance $y$ from the point $g$ to the point $a$. The outer perimeter is formed with an angular surface $h$ which is at its greatest inclination at the point $a$, the angle gradually approaching the vertical as it nears the points $b$ and $c$, where it merges into vertical surfaces. The cutting of this compound surface, which is in the form of a half ellipse with the varying angles and the reproduction of this contour, accurately and economically, in an automatic machine is a new and very valuable advance in the art.

The work table and operating means

The machine comprises a bed 1, in the upper forward portion of which are guideways 2 in which is slidably mounted a base plate 4. On the upper surface of the plate 4 is a circular groove 5 which receives a series of balls which engage a similar groove cut in the underside of the turntable or work table 6. The work table is circular and is rotatably mounted at its center upon a post 8, the lower end of which is secured at the center of the base plate. The work table is supported on the post by roller bearings 10.

On the underside of the work table is secured the circular beveled gear rack 12, which meshes with a bevel drive gear 14. Gear 14 is provided with a stem or sleeve 13 which is received in a bracket 15 attached to the movable bed plate 4 so that the gear is maintained in mesh with the gear rack 12 in all positions of the table. In the outer end of sleeve 13 is fixed the key piece 18, which is keyed on a feathered portion of a long shaft 20 on which the gear 14 is mounted and by which the work table is driven from a motor, as will be described.

To the underside of the base plate 4 is fixed a bracket 22 having a passage in which is received a shaft 24 by which the work table assembly is moved to and fro on the guideways 2 to generate the elliptical phase of the contoured work piece. The shaft 24 extends into a split collet 25 which is drawn into clamping engagement with the shaft 24 by the compression collar 26, threaded on the collet housing 27, which in turn is fastened to the bracket 22.

The shaft 24 is provided with a piston (not shown) which operates in a two-way hydraulic cylinder 30 mounted on supports 31 beneath the work table assembly. The admission of fluid pressure to opposite sides of the piston will move the work table assembly to and fro on the guideways 2. The means for controlling the movement of the work table assembly will be described later.

The upper side of the work table 6 is provided with a plurality of radial T-shaped slots 35, which receive the heads of bolts 36 on which are mounted the clamps 37 by which the work pieces A are mounted and secured to the work table. As noted above, in regular operation, two work pieces are mounted on the work table, but this is optional as one work piece or more than two may be machined at one time.

Figure 17:
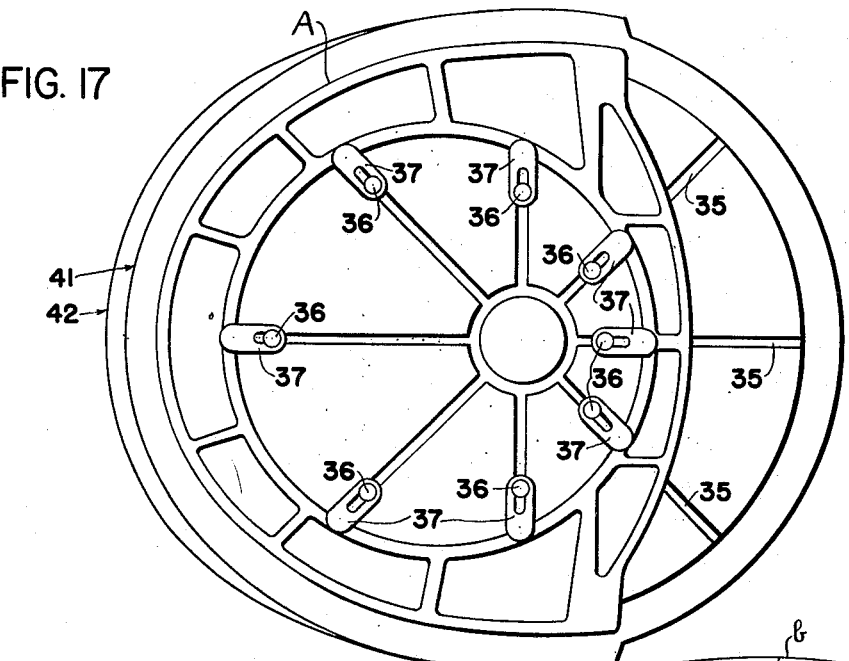
Fig. 17 is a plan view of the work table with the work clamped thereon, the location of this view being indicated by the line 17—17 of Fig. 1.

The edge of the work table is formed with a ledge 40, on which are secured the two templates 41 and 42. These patterns or templates are spaced by an insert or filler ring 44 so that they are at different operating levels. Each template is provided with a half elliptical portion, as shown in Fig. 17, which corresponds to and parallels the elliptical contour to be reproduced on the work piece. It will be observed, however, that the lower template 42 is offset with respect to the upper template 41, so that through the elliptical portion the edge of the template 42 projects beyond the edge of template 41.

In explanation of this showing, the template 41 is employed while the machine is cutting the angular surface $h$ on the perimeter of the work piece, while the template 42 is employed while the machine is cutting away the die draft $e$; in other words, template 42 is used while changing the work piece to the form shown in Fig. 14, while template 41 is used in changing the work piece from Fig. 14 to Fig. 15.

The reason for the divergence in the templates, as illustrated in Fig. 17, is that when the axis of the cutting tool, to be described, is vertical, as in making the first cut, its cutting surface is moved to the right (Fig. 1) and hence the work table must be moved further to the right to have the tool engage the work. On the other hand, when the axis of the tool is tilted to cut the angular surface $h$, the cutting surface of the tool is shifted to the left and hence the work table has to be moved further to the left to engage the tool and the work.

It will further be observed from Fig. 17 that as the angular surface $h$ gradually merges at the points $b$ and $c$, the edges of the templates approach until at the points $b$ and $c$ they will be in register.

The means for controlling the movement of the work table assembly to and fro to generate the elliptical contour of the work piece will now be described.

Rising from the rear of the bed 1 is a stanchion or housing, indicated as a whole by the numeral 44. On this stanchion is mounted a template follower to be described, one means for mounting being described. On the front face 45 of the stanchion is a vertical dove-tailed guideway 46 on which is slidably mounted a bracket 48 (Fig. 7), adapted to be clamped in vertically adjusted position by a set screw 49, or equivalent means. On the extremity of bracket 48 is secured a horizontal plate 50, the underside of which is provided with a dove-tailed guideway on which is mounted a sliding block 52, the position of which on the plate 50 is adjusted by the set screw 54. On the block 52 is a horizontal guideway on which is slidably mounted a device which is known in the art as a tracer valve and which is given the numeral 56. The position of the valve 56 on the block 52 is adjusted by the screw 57. It will be seen that the tracer valve 56 can be located at any point in space within the limits of the mounting therefor.

From the bracket 48 is extended a second bracket 59, in the outer end of which is pivoted a lever 60, the outer end of which carries a roller 62 which acts as a template follower and is yieldingly pressed against either template 41 or 42 by the pressure in the cylinder 30, which is in turn controlled by the tracer valve. The selection of the template is determined by shifting the vertical position of the tracer valve. The other end of the lever 60 goes to the tracer valve and operates the tracer valve in the manner well known in the art.

The details of the tracer valve are not shown. Tracer valves are made by several concerns and they operate valves which permit the passage of fluid pressure to one side or the other of the piston in the cylinder 30, through piping indicated at several points on Fig. 1 at 63.

The operation of the mechanism is that as the work table 6 is rotated the lever 60 is moved by the template which is engaged by the roller 62 and this, in turn, operates the tracer valve to shift the table to and fro on its guideways 2, through the action of the piston transmitted to the table assembly through the shaft 24. As the location of the cutting tool is fixed, the shifting of the work table creates the elliptical contour on the work piece.

*The driving mechanism*

Figures 3A, 11:
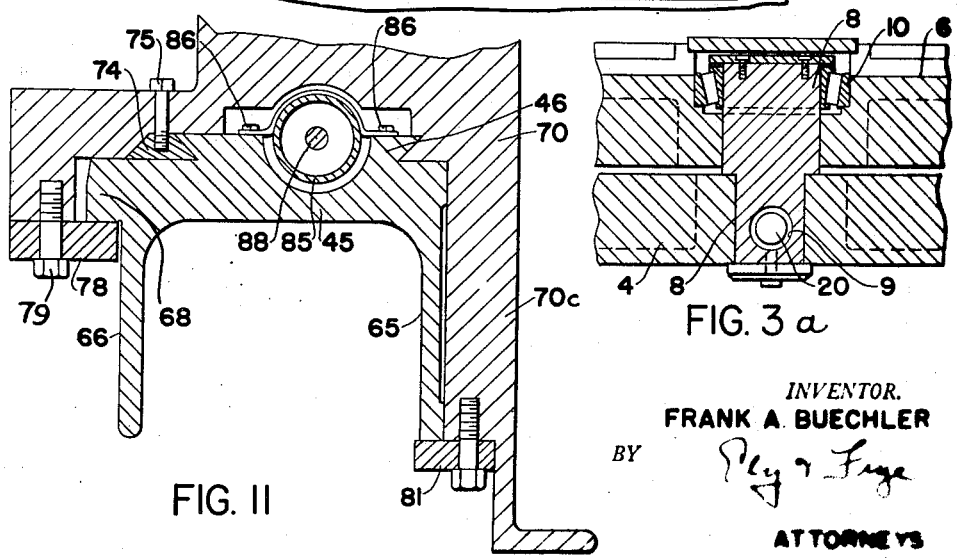
Fig. 3a is a section on the line 3a—3a of Fig. 1.
Fig. 11 is a section on the line 11—11 of Fig. 6.

The stanchion 44 is a three-sided housing, on the front face 45 of which is the vertical dovetailed guideway 46 referred to above. It has the two parallel side walls 65 and 66 and is open to the rear (see Fig. 11). At the upper right hand corner it has a vertical rib or flange 68. The stanchion is bolted to the bed through lower flanges at the base of the stanchion, as shown at 69. It supports the heavy, overhanging superstructure or head indicated as a whole by the numeral 70. The head fits around the front and one side of the stanchion and has a dove-tailed groove 72 which fits against one side of the guideway 46, the other side of the guideway being engaged by the shim 74 which is drawn against the guideway by bolts 75. The side of the head which engages the rib 68 is provided with a heavy clamping plate 78 which is drawn by bolts 79 against the rear face of the rib 68. The other side of the head fits against the side wall 65 and is clamped against the rear of the stanchion by a vertical plate 81 drawn against the rear edge of the side wall 65 by bolts 82.

The head is raised or lowered on the stanchion by hydraulic means. In a recess in the front of the stanchion is located a hydraulic cylinder 85 (Fig. 6) which is attached to the stanchion by straps and bolts 86. The piston rod 88 is extended below the cylinder where it is connected to a plate 87 secured to the underside of the head 70. The upper end of the piston rod 88 is extended above the cylinder, is threaded and passes through a plate 90 secured on the top of the stanchion. Lock nuts 91 bear against the top of plate 90 and hold the piston in its adjusted vertical position until the head is clamped to the stanchion by the several means provided.

Fluid pressure is admitted to the cylinder 85 through a conduit 93 which extends through a slot 94 in the front wall of the stanchion. A pump 96 is driven by a motor 97, the pump being supplied from a reservoir 98 in the base of the machine. The pump supplies the fluid pressure to the cylinder through valves and piping, the details of which are not shown. It will also be noted that the pump 96 also supplies the power to move the tool carriage, to be described, to and fro on the head.

Figure 10:
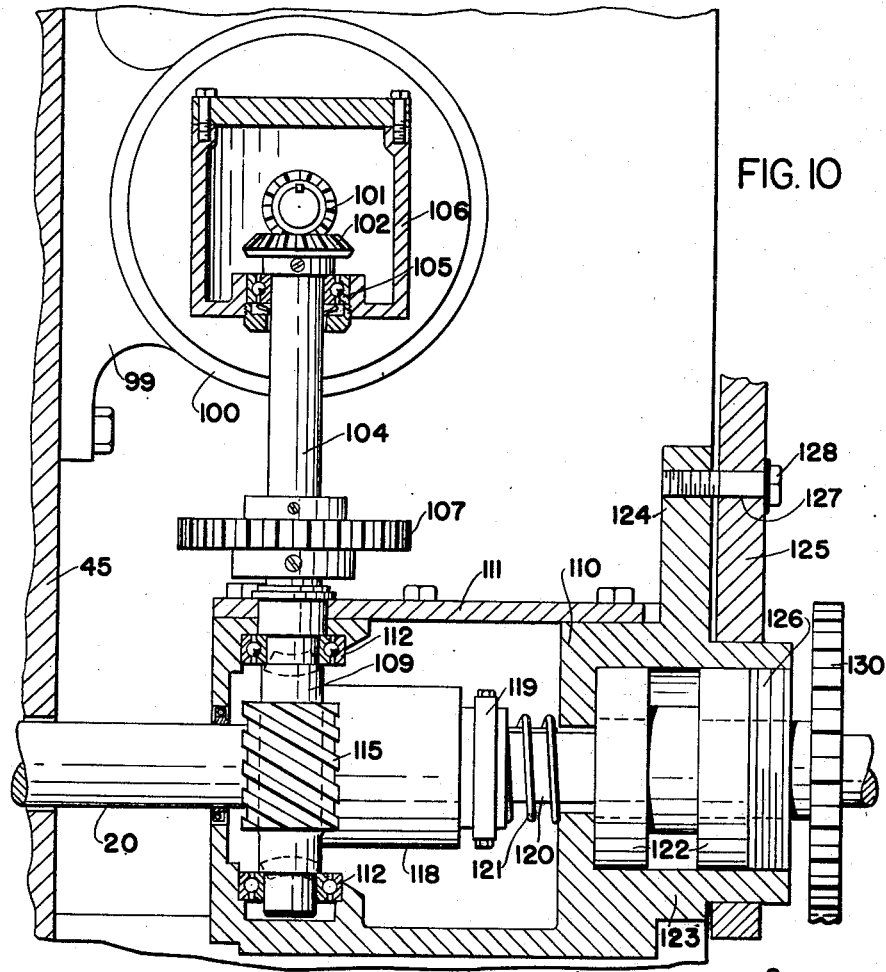
Fig. 10 is a vertical section through the driving mechanism for the rotating work table. The location of this view is indicated by the line 10—10 on Fig. 2.

In the interior of the stanchion 44 and attached to the rear face of the front wall thereof by bracket 99 is a motor 100, the shaft of which drives a bevel gear 101 engaging a pinion 102 fixed to the upper end of the vertical power shaft 104 (Fig. 10). The upper portion of shaft 104 is mounted in bearing 105 located in the lower side of a housing 106 secured to the casing of the motor 100. On the lower end of shaft 104 is a pinion 108 which meshes with a larger gear 107 on the upper end of a shaft 109. Shaft 109 extends through a cover 111 of a transmission housing 110, which is secured to the top of the bed within the stanchion. The shaft is set in spaced bearings 112 in the housing 110 and between these bearings is fitted with a worm 115 which engages and drives a worm gear on the shaft 20, which drives the work table through the connections previously described.

The shaft 20 extends through the front wall 45 of the stanchion and its inner end, through a clutch 118, drives an aligned shaft 120. The clutch, which may be of any desired form, is held in the fast driving engagement by the adjustable collar 119, backed up by spring 121. This will permit the shaft 120 to be turned independently of shaft 20 in the setting of the machine. Shaft 120 rotates in bearings 122 which are located and held in place by threaded ring 126 in a sleeve 123 formed as a part of the rear wall of housing 110. A web 124 extends upwardly from the rear of the housing and the sleeve is extended rearwardly to provide a bearing for the lower end of a lever arm 125. Above the sleeve the arm 125 is provided with an arcuate slot 127 and extending through the slot and threaded into the web 124 is the bolt 128. This arrangement permits the arm to be located in various angular positions about the axis of the shaft 120 for reasons to appear.

The purpose of the shaft 120 is to drive the rotating cam which varies the inclination of the cutting tool during the machining of the angular surfaces h in synchronism with the rotation of the turntable which is propelled through the shaft 20. For this purpose there is mounted on the rearwardly projecting end of shaft 120 a driving gear 130. Gear 130 is in mesh with a larger gear 132, which in turn meshes with a small pinion 134 on the rotating cam to be described.

As will be explained in connection with the operation of the machine, it is necessary that the rotating cam which controls the inclination of the cutting tool be accurately set with respect to the location of the work piece; otherwise, accurate angular surfaces on the work piece will not be obtained. It is also desirable to have the machine equipped so that the speed of rotation of the cam may be varied with respect to the speed of rotation of the table. There is therefore provided, in the drive mechanism for the cam, means for turning the cam independently of the drive mechanism for the work table, to bring the inclination of the tool to the correct point at the start of the work and also to establish the correct relationship between either of the templates 41 and 42 and the cam which controls the position of the tool. The mechanism for accomplishing this result will now be described, as well as the means for varying the relative speeds of the cam and work table.

The large gear 132 is mounted on a shaft assembly, indicated as a whole by the numeral 136, and this shaft assembly is in turn mounted in a long slotted guideway 138 cut in the upper end of the lever arm 125 and held in place by bolt 139. The swinging lever arm may therefore be adjusted about the axis of the shaft 120 so that different size gears may be substituted for the gears 130 and 134, and the relative speeds of rotation of the cam and the turntable 6 may be adjusted.

To the extreme rear end of the shaft 120 is fixed a large hand wheel 142. This hand wheel is used to adjust the angular position of the rotating cam with respect to the position of the work table and the templates carried thereby. To accomplish this purpose, the clutch 118 is disengaged by means of an operating lever (not shown) and the hand wheel is then rotated to bring the rotating cam to its correct position. This having been done, the clutch is again engaged to reestablish the positive driving connection between the shafts 20 and 120. A further means for accomplishing fine adjustments is by shifting the cam about its shaft, means for accomplishing which will be described.

*The head and the cutting tool and its operating mechanism*

Reference has been made to the head 70. This is shown in side elevation in Fig. 1 and in plan in Fig. 2. It is a heavy beam which has a main body portion 70a which fits against and is clamped to the top of the stanchion in the manner described. It also has an outwardly extending cantilever arm 70b which is offset with respect to the main body and carries the cutting tool and its operating mechanism. It also has the rearwardly extending portion 70c which fits against the side wall 65 of the stanchion and supports a part of the tool operating mechanism. Around the portion 70c is a flange 70d.

The face of the arm 70b is vertical and approximately midway of the arm is a circular opening 150 in which is located a bearing 151 in which is rotated one of the pins or shafts 152 which forms the pivotal support for one side of the rocking tool carrier or housing, indicated as a whole at 155. A plate 156 is set in the side of the opening 150 and a cap 157 held by bolts 158 holds the bearing in position (Fig. 3).

Extending from the main body of the head and spaced from the arm 70b is a second arm 160 parallel therewith. To the under surface of the arm 160 is attached, by bolts 161, a block 162 having an opening 163 in alignment with the opening 150. In this opening is the bearing 164 for the pin 165 which forms the pivotal support for the other side of the tool carrier 155. A threaded spacer sleeve 166 on the pin 165 spaces the bearing from the side of the tool carrier, and a cap 167, similar to cap 157, and bolts 168 hold the bearing 164 in place. On the vertical face of the arm 70b is an arc-shaped bearing strip 170 held in place by bolts 171 and which affords a bearing surface over which the side of the tool carrier moves while the tool carrier is rocked.

Figures 4, 5:
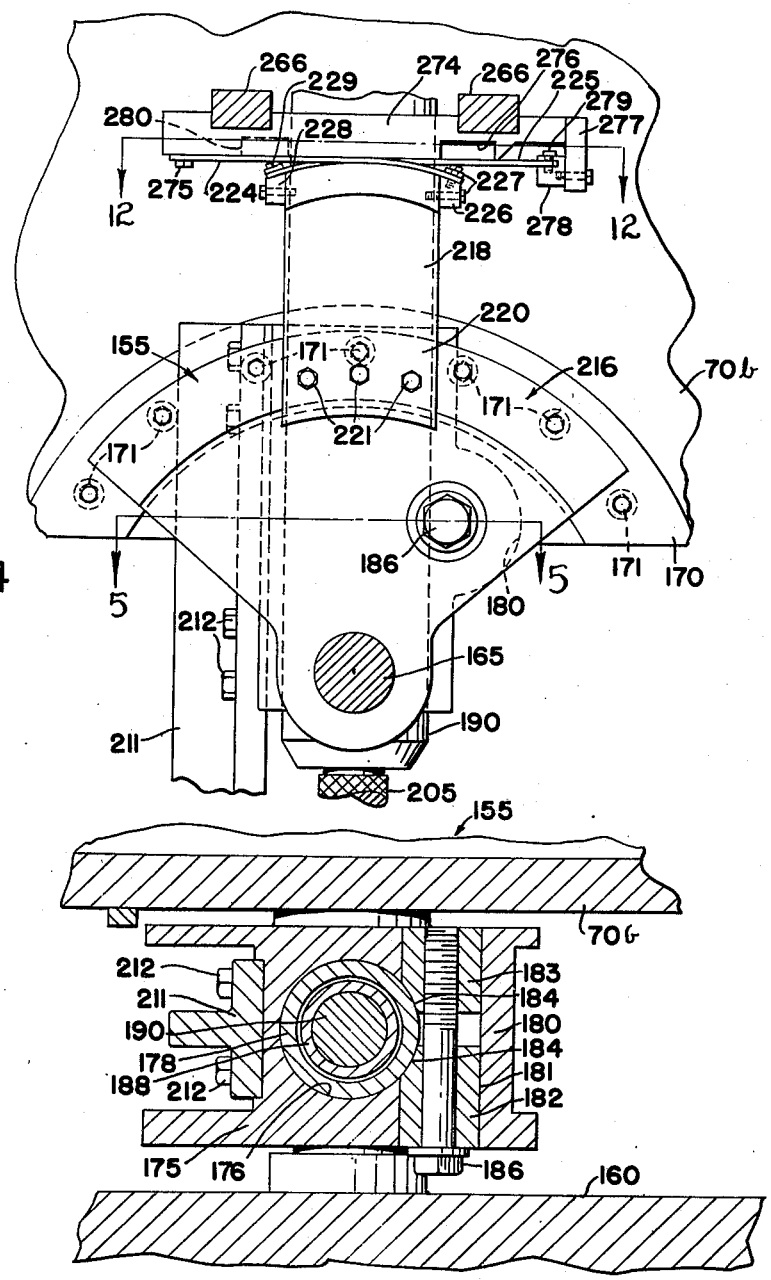
Fig. 4 is a side view of the rocking tool carrier taken on the lines 4—4 of Figs. 2 and 3.
Fig. 5 is a horizontal section on the line 5—5 of Fig. 4.

The tool carrier or housing which has been given the general reference character 155 is shown in elevation in Fig. 4, in vertical cross section in Fig. 3, and in horizontal cross section in Fig. 5. It has a central body portion 175 in the front face of which is machined a cylindrical recess 176, in which is snugly fitted the barrel 178 in which the cutting tool is rotatably mounted. At the side of the body is formed a lug 180, having a transverse central passage 181 which partially intersects the recess 176 so that a portion of the barrel is exposed. Two sliding clamping blocks 182 and 183 are fitted in the opening 181 and have arc-shaped surfaces 184 which are drawn into tight clamping engagement with barrel 178 by a bolt 186 passing through the block 182 and threaded into the block 183. This is the means by which the tool is fastened in the rocking tool carrier.

Located in the barrel 178 is the hollow sleeve 188 in which the tool spindle 190 is fitted. The construction of the tool spindle may be varied but in the form shown the sleeve 188 bears at its upper and lower ends against the ball bearings 192 and 193, respectively. The lower bearings 193 are held in place by a threaded lock ring 194 against a shoulder cut in the lower end of the barrel. The upper bearings 192 are likewise seated in a recess in the top of the barrel and rest upon a ring-shaped bearing member 195 which is urged upwardly by coil springs 196 nesting in the ring 195 and bearing upon a flat ring 198 at the base of the recess in the barrel. A ring 199 is threaded on the upper portion of the spindle and holds the bearings 192 in place. The assembly is held in place by a cap 200 threaded onto the upper end of the barrel 178.

The spindle 190 extends upwardly beyond the tool carriage and to its upper end is fastened a pulley 202 adapted to be driven by belt 203 from a source of power.

In the lower end of the spindle is fastened one reduced end of the cutting tool 205 which is held in position by a set screw 206. The lower end of the tool is likewise reduced and to it is fitted one element of the ball bearing 207. The bearing 207 is held in a recess 208 which is formed in the horizontal extension 210 of an arm or bracket 211. This arm extends upwardly and is fastened to the side of the tool carrier 155 by bolts 212, which hold it in a seat provided for the purpose on the side of the carrier opposite the clamping blocks 182 and 183.

The tool which is illustrated is a cylindrical milling cutter and, in operation, it is rapidly rotated through the pulley and belt.

The tool carrier is provided at its sides with two sector-shaped wings. The wing to the right in Fig. 3 is given the reference numeral 215 and its function is to ride over the bearing strip 170 to steady the movement of the tool carrier as it rocks about the axes 152—165.

The wing 216, to the left in Fig. 3, is the means by which the tool assembly is rocked. The rocking action is imparted by the rotating cam previously referred to. Fitted against the outer curved edge portion of the wing 216 is the lower end of an arm 218 provided with an arc-shaped rabbet 219 to rest upon the edge of the wing and with a depending flange 220 which is bolted to the wing at 221. The upper end of the arm 218 is formed on a circle concentric with the axes 152—165 and to this surface are attached the ends of two parallel flexible steel straps 224 and 225 which lie side-by-side on the top of the arm 218. The strap 224, to the left in Fig. 3, is attached by bolt 227 to a block 226 fastened at the right-hand side of the arm 218 as viewed in Fig. 4. The strap 225 is fastened by bolt 229 to a block 228 at the other side of the arm.

The strap 224 rocks the tool carriage in a counter-clockwise direction by pull exerted thereon in one direction in Fig. 4, while the strap 225 rocks the tool carriage in a clockwise direction by pull exerted thereon in the opposite direction, the respective straps being wrapped or unwrapped about the upper edge of the arm 218, depending upon the direction in which the tool carriage is moving. Obviously the straps pulling in opposite directions at all times provide means for rocking the tool 205 to various positions and maintaining it accurately in any angular position against the side thrust imparted to the tool by the work piece.

The mechanism for operating the straps 224—225 will be described in connection with the rotating cam.

*The rotating cam and its operating mechanism*

Figure 2:
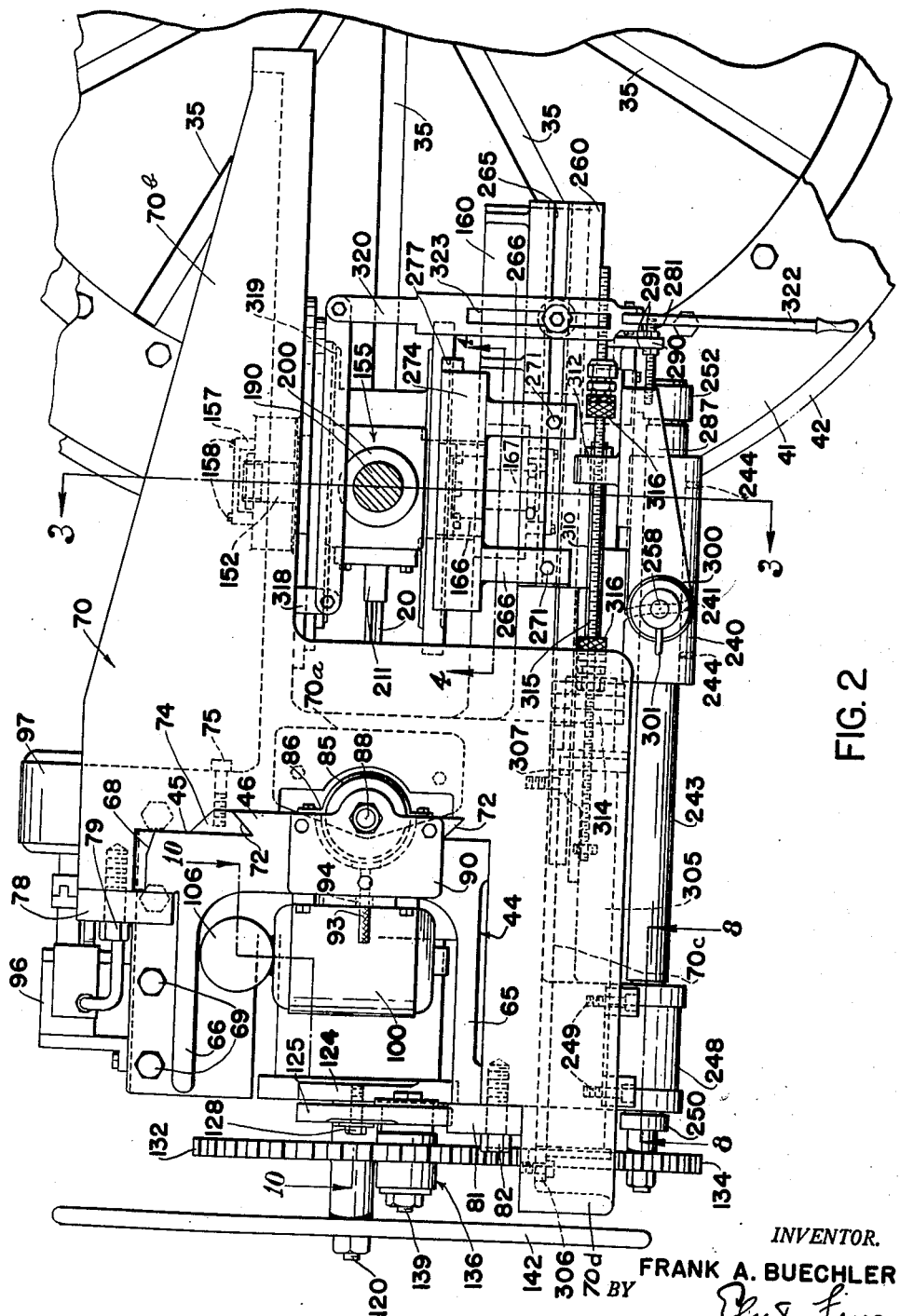
Fig. 2 is a plan view of the head of the machine, the location of this view being indicated by the line 2—2 of Fig. 1.

The rocking of the tool carriage generates the angular surfaces on the edges of the work piece, but during the cutting away of the die draft the tool is fixed with its spindle in vertical position and the mechanism to be described operates during the rotation of the work table either to hold the tool with its axis in a true vertical plane or to rock it about the axis of the tool carriage. It will be noted at this point that, due to the location of the axis of the tool carriage, the tilting of the tool as shown in Fig. 1 shifts the cutting surface away from the work, while shifting the tool to its vertical position moves it toward the work. This is the reason for the diverging configuration of the two templates 41 and 42 as shown in Fig. 17.

A pattern in the form of a rotating cam is given the reference numeral 240. As the angular surfaces on the work pieces must be accurately formed, the cam is relatively large in diameter and the spiral groove 241 formed therein is of relatively low pitch. The cam is a cylinder fixed to a long horizontal shaft 243 by set screws 244. This permits a fine adjustment of the cam about its shaft, as referred to above. The shaft extends along the front of the head and near its inner end is reduced, as shown in Fig. 8, and received in two ball bearings 245 and 246 mounted in the ends of a cylinder 248 which is fastened to the face of the head 70 by bolts 249. A threaded collar 250 holds the bearings in place and the cylinder 248 is packed with lubricant. The inner end of shaft 243 is attached to its driving gear 134 previously described. The outer end of shaft 243 is mounted in a ball bearing 251 which is mounted in a bracket 252 fixed to the arm 160. The described mounting keeps the shaft steady and avoids any vibration.

Adapted to cooperate with the groove 241 is a stylus or follower 258. The mounting and operation of the stylus and the means by which movement of the stylus is transmitted to the rocking tool carriage will now be described.

On the front face of the arm 160 is a horizontal dove-tailed rib 259 on which is mounted a slide 260, the cross section of which is shown in Fig. 3 and the shape of which is shown in Fig. 1. It has a dove-tailed groove 261 engaging the rib 259, the lower side of the rib being formed by the shim 262 held on the slide by bolts 263.

The forward portion of the slide is elevated somewhat above the rearward portion thereof and in the top surface thereof, where the slide rides on the upper side of the arm 160, is formed a T-shaped slot 265. Projecting from the top of the slide are two parallel arms 266, the ends of which overlie the groove 265 and are provided with lugs 268 which partially enter the groove. A headed stud 270 is passed through each arm 266, the head being received in the base of the groove and being drawn into clamping engagement with the horizontal wall of the groove by a nut 271 threaded upon the upwardly projecting stem of the stud. The arms 266 are thus anchored to the slide 260 at any desired point along the top of the slide.

The inner ends of the arms 266 are welded to a plate 274 shown in detail in Figs. 4 and 12. The plate 274 is the device which directly operates the straps 224 and 225, by which the tool carriage is rocked. Plate 274 is an elongated bar and to the under face thereof, at one end, the outer end of the strap 224 is anchored by a threaded stud 275. The underside of the plate 274 is recessed at 276 so as to provide clearance for the bolt 227. On the other side of the plate 274 is welded a downwardly extending lug 277, the inner face of which is notched to receive the outer end of the strap 225 which is anchored to the lug by a threaded stud 279. At the left hand end of the plate 274 a recess 280 is provided to allow clearance for the stud 229.

It will be seen that as the plate 274 is moved to and fro by the slide 260 that movement will be transmitted by the straps 224 and 225 to the rocking tool carrier 155, the straps wrapping about the arc-shaped end of the arm 218 to the surface of which they are held by the overlying plate 274.

On the front face of the slide 260 is a dovetailed rib 284 which is engaged by a dove-tailed groove 285 on the rear face of a stylus carrier slide block 287. The stylus carrier is adjustable with respect to the slide 260 and is held in whatever position is determined by means of a threaded pin 281 which extends to the right as shown in Fig. 9 through a lug 290 projecting from the slide 260 and to which it is held by the lock nuts 291. If additional securing means is desirable, a bolt 294 may be passed through the top of the stylus carrier and engage any one of a series of threaded sockets cut in the side of the rib 284.

The stylus carrier is L-shaped in cross section, the vertical arm lying against the face of the slide 260. The horizontal arm is extended to the left as shown in the several views and in the end thereof are mounted the two spaced ball bearings 298 which support, for free rotation, the sleeve 299 of a stylus holder 300. The body of the stylus is fitted into the sleeve and is locked in position by a set screw 301. A collar 303 is threaded onto the lower end of the sleeve of the stylus holder and holds the assembly together, being held in position by a set screw 304.

When the machine is cutting the angular surfaces, the lower end of the stylus engages the groove 241 and the tool carriage is rocked by the connections described. When machining the die draft, however, the stylus is raised to the dotted line position shown in Fig. 9 and locked out of contact with the rotating cam so that the latter rotates idly.

Figure 16:
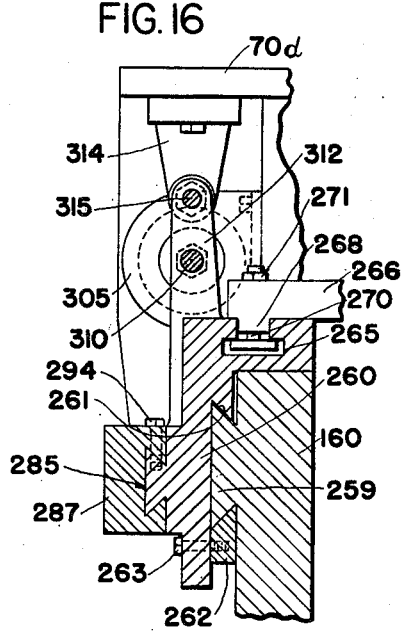
Fig. 16 is a detail of the tool carrying head on the line 16—16 of Fig. 1.

To obtain an accurate cut, the stylus is yieldingly held at all times during the operation of the rotating cam against one wall of the groove 241. In the drawings, this is the right hand wall. This function is performed by an air cylinder 305, which is mounted on the front face 70c of the head 70 by brackets 306 and 307 (Fig. 1). The cylinder is maintained under a constant pressure through the line 308, during the cutting of the angular surfaces on the work piece. The piston in this cylinder (not shown) has a rod 310 which extends to the right as shown in Fig. 1 and is anchored in a vertical arm 312 extending upwardly from the slide 260 (Fig. 16). In this manner, pressure is always exerted during the cutting of the angular surfaces to keep the stylus in contact with the wall at one side of the groove 241. This also explains the rotatable mounting for the stylus, permitting it to rotate freely while held in contact with the wall of the groove, not only facilitating the operation but also eliminating wear on the stylus and the wall of the groove.

In cutting the vertical surfaces on the work piece, it is essential that the slide 260 be not allowed to creep. For this purpose there is attached to the underside of flange 70d a bracket 314 in which is anchored the rear end of a long rod 315, which extends through the arm 312. The rod 315 is threaded throughout and normally passes freely through the hole in the arm 312. A set of lock nuts, indicated generally by the numeral 316, is threaded on the rod and in cutting the angular surfaces these are run back as shown in Fig. 1, so as not to interfere with the movement of the slide 260. When, however, the machine is set for the vertical cut and the stylus 258 is lifted out of the groove 241, the nuts are run up to the sides of the arm 312 to lock the slide 260.

It is desirable to provide for manual operation of the slide 260 as is sometimes required for putting finishing touches on the work. For this purpose, a bracket 318 is provided on the head 70, in which is pivotally mounted a link 319 to the outer end of which is pivoted the hand lever 320 which projects toward the front of the machine where it is provided with a rocking handle 322 which can be swung upwardly and lie along the lever 320 when not in use. The lever 320 is provided with a slot 323 in which is clamped the upper end of a post 324, the lower end of which extends into the slot 265 on the slide 260, to which it is clamped in the same manner that the studs 270 are clamped in the groove.

Operation

The work piece or work pieces are clamped in position on the work table, care being taken that the point g is at the center of the work table. The first operation being to cut away the die draft e, the stylus 258 is moved out of the groove 241 and the slide 260 is locked in position so that the axis of the tool is vertical. The tracer arm is now adjusted so that the roller 62 is at the level of the template 42. The machining operation will start at one extremity of the surface to be machined and be carried around the entire surface. Pressure is now admitted to one end of the cylinder 30 and the motor 100 is set in operation. The tool will now start in motion concurrently with the slow rotation of the table. The fluid pressure in the cylinder 30, through the operation of the tracer valve, will feed the table toward or from the tool generating the elliptical cut.

The machine is now set to cut the angular surfaces h. The nuts 316 are backed off and the stylus 258 lowered into the groove 241 on the rotating cam 258. Pressure is admitted to the cylinder 305 to keep the stylus against the right hand wall of the groove. The roller 42 is brought to the level of the template 41. As the operation starts at a point where the finished surfaces are vertical, the tool is vertical at the start of the operation.

The machine is now set in motion. As the machining operation proceeds, the tool is gradually tilted until it reaches its maximum inclination at the point a. Thereafter, the tool returns gradually to its vertical position at the end of the operation. The tilting of the tool is controlled by the cooperation of the stylus with the rotating cam. The amplitude of movement of the work table to the right or left is not as great as in the first operation because the tilting of the tool itself feeds it into the work and hence the template 41 has the lesser radius and consequently the operation of the tracer valve is retarded to feed the work table toward and from the tool at a reduced speed.

What is claimed is:

1. Apparatus for machining a gradually changing angular edge on an irregular work piece, the combinaiton of a shiftable work table to which the work piece is fixed, means for rotating the work table, a head projecting over the table, a pivotally mounted tool carrier on the head, a rotating cutting tool on the carrier and located with one side engaging the work piece, means for rotating the tool, a rotating cam, a cam follower, driving connections between the cam follower and the tool carrier to rock the carrier and gradually vary the angular position of the tool while maintaining the tool in accurate position against the side thrust of the work piece, means to drive the cam in synchronism with the rotation of the table, means to shift the table toward and from the tool during the rotation of the table, and template means on the table cooperating with said table shifting means to cause the tool to follow the contour of the work piece.

2. Apparatus for machining a gradually changing angular edge on an irregular work piece, the combination of a shiftable work table to which the work piece is fixed, means for rotating the work table, a head projecting over the table, a pivotally mounted tool carrier on the head, a rotating cutting tool on the carrier and located with one side engaging the work piece, means for rotating the tool, a rotating cam, a cam follower, driving connections between the cam follower and the tool carrier to rock the carrier and vary progressively the angular position of the tool, said driving connections including tensioned bands resisting side thrust of the work piece on the tool, means to drive the cam in synchronism with the rotation of the table, a template fixed to the table, a template follower, and means actuated by the movement of the follower to shift the axis of the table with respect to the cutting surface of the tool during the rotation of the table.

3. Apparatus for machining a gradually changing angular edge on a non-circular work piece comprising a work table to which the work piece is fixed, means for rotating the work table, a head projecting over the table, a tool carrier pivotally mounted in the head, a cutting tool depending from the head in position to have one side of the tool engage the edge of the work piece, means to rock the carrier during the rotation of the table to vary progressively the angle to be cut on the edge of the work piece, said rocking means maintaining the tool in accurate position against the side thrust of the work piece, a template attached to the work table, a template follower, and means acting in response to the movement of the template follower to shift the table toward or from the tool to cause the tool to follow the contour of the work piece.

FRANK A. BUECHLER.

References Cited in the file of this patent

UNITED STATES PATENTS

| Number | Name | Date |
|---|---|---|
| 1,842,145 | Breitenstein | Jan. 19, 1922 |
| 1,974,919 | Harris et al. | Sept. 25, 1934 |
| 2,026,487 | Williams | Dec. 31, 1935 |
| 2,345,494 | Onsrud | Mar. 28, 1944 |
| 2,387,075 | Johnson | Oct. 16, 1945 |
| 2,593,363 | Thalmann | Apr. 15, 1952 |
| 2,624,242 | Eberle et al. | Jan. 6, 1953 |

FOREIGN PATENTS

| Number | Country | Date |
|---|---|---|
| 650,279 | Great Britain | Feb. 21, 1951 |